INVENTORS
ROYAL R. HAWKINS,
ALVIN C. WELCH
BY Joseph E. Ryan
ATTORNEY

Fig 3

United States Patent Office 3,174,089
Patented Mar. 16, 1965

3,174,089
MACHINE TOOL CONTROL WITH ADJUSTABLE
LIMIT CONTROL
Royal R. Hawkins, Bloomington, and Alvin C. Welch,
Edina, Minn., assignors to Honeywell Inc., a corporation of Delaware
Filed June 26, 1962, Ser. No. 205,371
5 Claims. (Cl. 318—162)

This invention relates to machine tool control and more particularly to improvements in a machine tool control through the provision for adjustable limit positioning control as will be hereinafter identified.

In machine tools, such as automatic lathe machines and lathes, the use of predetermined limit positions for controlling the direction of feed motion is often a prerequisite so that over-all feed action in the machine may be compounded with similar feed motions in other parts of the machine to provide adjustable stopping, reversing or starting operations in the operations of the tool. A common way of initiating such modification or limit operation is through the use of a limit switch which is positioned on the tool and cooperates with an actuating member on other movable portions of the tool to define such limits positions. To make such limit positions adjustable, normally manual operation is employed, or a plurality of positioned switches are utilized to be sequentially switched into a control circuit for the purpose of altering the limit positions. The present application is directed to an improved adjustable limit position control employed in a machine tool apparatus which eliminates the necessity for switches on the machine and manually or physically adjusting the same. It provides a means for automatically determining a desired change in limit position with operation of the machine and apparatus for controlling machine operation to new limit positions.

In disclosing the subject invention, the improved limit positioning control is shown applied schematically to a lathe type operation in which a plurality of steps are utilized in removing material from the work piece in the operation of the tool in a conventional multiple cut or pass tracing arrangement. This multiple step operation is joined with a conventional pattern tracer type control for ultimate positioning of the tool parts and working of the work piece. Since the patterns are irregular, considerable machine operation and time may be saved by adjusting the position of each step or the starting point thereof in such a manner that originally machined surfaces will not have to be retraced. Thus, in a lathe operation of the multiple cut type, both tracer and adjustable depth of feed operation are used jointly and with the improved adjustable limit position control, so that the machine may be started at each new work path or direction of feed motion at a point where the preceding cut or machining left off. By automatically adjusting this position in the operation of the machine, considerable time and effort are saved to economize in the operation of the machine and to improve the accuracy in the machining operation. The heat of this adjustable limit control is a control circuit which combines both the entire motion of the machine tool in the working direction in terms of a signal output and a second signal output which memorizes or maintains the desired starting point for the next operation in sequence to control the operation of the machine in such a manner that when the elements thereof arrive at the new starting position, the proper feed motion is initiated by the limit control.

Therefore, it is an object of this invention to provide an improved machine tool control. Another object of this invention is to provide in a machine tool control an improved adjustable limit control. A further object of this invention is to provide an apparatus of this type means for adjusting the limit position of an automatic multiple cut machine tool so that each cut may be initiated at a point where repeated machine operation from the preceding sequence is not necessary. A still further object of this invention is to provide in an adjustable limit switch assembly a simplified circuit which is economical to manufacture and provides for accuracy in machine operation. These and other objects of this invention will become apparent from a reading of the attached description together with the drawings, wherein:

Figure 1:
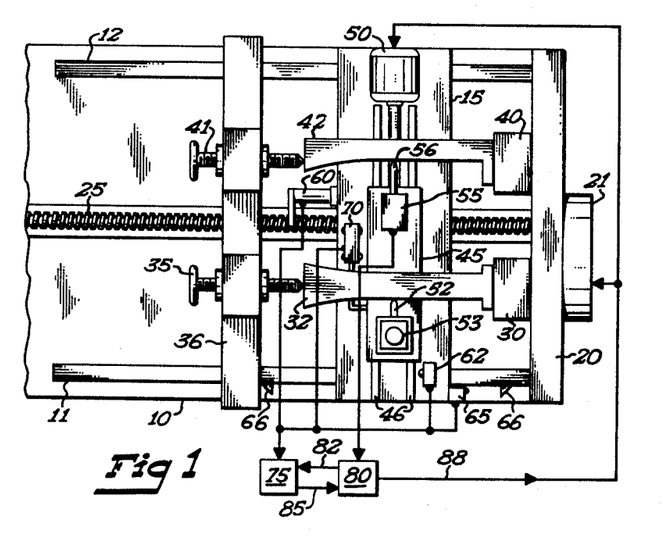
FIGURE 1 is a schematic disclosure of the machine tool including broadly the embodiment of the present invention.

This improved machine tool control apparatus with the adjustable limit positioning control is shown schematically as applied to a lathe type machine tool in FIGURE 1. For simplicity in disclosure, only a portion of the tool is shown to explain the cooperation of the parts of the control apparatus. Thus, the tool is shown as comprising a lathe bed 10 having a pair of guide means 11 and 12 thereon which mount and position a carriage 15 in a conventional manner. Mounted on the base or bed of the tool is a headstock or head portion 20 which rises above the bed and mounts the motive means 21 for driving the carriage relative to the bed. This motive means is geared to a helical drive screw 25 which fits into a cooperating part in the carriage (not shown) to move the carriage translationally across the bed along an axis, hereinafter defined as the longitudinal axis of the machine, in a conventional manner. The motive means 21 also may operate the spindle 30 in which the work piece 32 is chucked or secured. The work piece is guided by means of a centering mechanism indicated generally at 35 carired by a tail stock 36 or tail piece also mounted on the bedded machine. In addition to the work piece 32 which is guided between the head and tail stock and driven by the spindle motor or attachment to the carriage drive, the head and tail stocks 20 and 36 also provide mounting means such as is indicated at 40, 41 for the template or pattern indicated generally at 42. It will be understood that the spindle drive may be separate from the carriage drive, if desired or may be controlled through suitable separate control apparatus not shown.

The carriage means 15 mounts a cross slide indicated generally at 45 which is guided on the carriage by means of transversely extending guides 46 and positioned thereon through motive means indicated generally at 50. The cross slide mounts the cutting tool 52 which is mounted on the cross slide and adjustably positioned through adjustment means 53 thereon to be positioned adjacent the work piece and cause cutting operation on the same. Mounted in a similar position with respect to the template 42 is a tracer head indicated generally at 55, the tracer head including a stylus 56 which, like the cutting tool, is positioned adjacent the template and designed to contact the same and provide an electrical signal output in a manner to be later described. The position of the carriage means relative to the bed 10 is evidenced electrically by means of a transducer or multiple turn helical potentiometer indicated generally at 60 which is connected to and driven by the helical drive screw for the carriage piece. This transducer provides an indication of the carriage relative to the bed for purposes to be later noted. The position of the cross slide 45 on the carriage 15 is indicated by a cross slide transducer indicated generally at 70, which transducer is mounted on the carriage and connected to the cross slide to indicate positioning of these parts and hence position of the cutting tool relative to the work piece. In addition to the control apparatus enumerated, the cross slide also cooperates with a limit switch indicated at 62 positioned on the carriage to define the outer limit position of the cross slide as it retracts during a multiple pass or multiple cut operation. Similarly, the carriage means is shown herein as including one fixed limit switch indicated at 65 carried on the carriage and cooperating with an adjustable cooperating member 66 on the base or guide 11 which will define with the element or switch 65 on the carriage an ultimate limit position for carriage movement when feed is in the direction leading from left to right as shown in FIGURE 1. It will be understood that this fixed limit switch may be replaced with a similar type of adjustable limit switch assembly, if desired, however. It is shown herein as a fixed limit switch for the end of a cut movement as will be later understood as the disclosure proceeds.

Schematically, FIGURE 1 shows in addition the interrelation between the control apparatus on the machine and associated equipment remote from the machine. Thus, a first control network shown generally in block at 75 receives input signals from the cross slide transducer 70, the carriage transducer 60, the limit switches 62 and 65, and, as will be later noted, an input signal from a second control network and amplifying circuit shown also in block at 80 through a conductor or connection indicated generally at 82. This arrow or conductor, as will be later noted, is actually a signal from the tracer head which is shown in FIGURE 1 as connected directly to the amplifying and control network 80. The output of the control network 75 is indicated as controlling or as directed through a conductor or conductors 85 to the amplifying and controlling network block 80 whose output is shown as directed through the control line or network 88 to the carriage transverse drive motor 21 and the cross slide motivating unit or motor 50. The elements shown in the block 75 are disclosed in detail in the schematic wiring diagram of FIGURES 3 and 4. As will be later noted, the apparatus shown schematically in block 80 is a conventional control network of the tracer type controlling the energization of a pair of motors for either single or two axis type machine tool operation.

As an example of a two axis tracer system applicable to this control network and amplifying circuit 80, reference is made to the J. J. Rudolf, et al. Patent 2,962,654 dated November 29, 1960 and entitled "Automatic Duplicating Control Apparatus."

Figure 2:
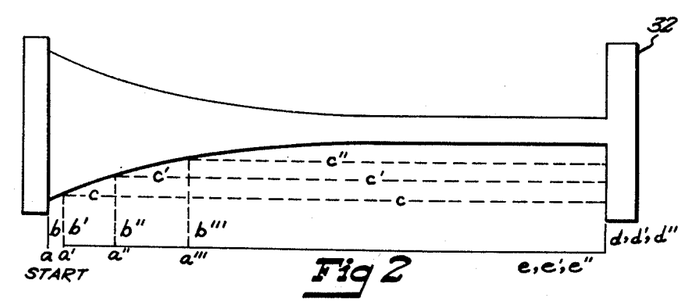
FIGURE 2 is a schematic diagram of the motions described by sequential feed operation for the purpose of explaining the subject invention.

The disclosure in FIGURE 2 is a schematic diagram tracing the paths of the tracer relative to the template and the cutting tool relative to the work piece during a multiple cut or multiple pass type of machining operation. This schematic diagram is included to set forth the operation of the improved adjustable limit positioning control apparatus as it is applied to the present disclosure. The same path will be traced by the tracer and tool simultaneously as these parts move with respect to the template and workpiece. Thus, as shown in FIGURE 2, the work piece 32 will be engaged by the tool sequentially in a plurality of cutting operations. Assuming the start of the machining operation to be indicated at point "a" labeled as "Start" in FIGURE 2 each pass or cutting operation is broken down into four steps requiring machine movement. Thus, as will be seen in FIGURE 2, on the first path the second step or actual input step is labeled as "b" in which the cross slide will move the tool and hence the stylus relative to the work piece and template respectively to a point where the stylus and template, tool and work piece are in engagement. Upon engagement of the tracer with the template, the control network and amplifying circuit indicated schematically at 80 in FIGURE 1 will control the operation of the machine tool to cause the cross feed and carriage drive to move simultaneously and trace a path of the cutter or cutting tool on the work piece corresponding to the shape of the template. This tracing movement, which is conventional, will continue until such a time as desired depth of location or cut is reached indicating the first plateau for the multi-pass operation. At this time further in-feed or movement by the cross feed will cease and the carriage will drive across the tool performing a cutting operation in a longitudinal direction such as is indicated by the dotted line "c," continuing until the end position is reached, which herein is controlled by an end limit switch 65, at which point longitudinal drive or carriage drive will cease. At this point the cross slide will be withdrawn while the carriage remains stationary following along the path indicated at "d" until a position is reached corresponding to the out limit position of the cross slide and determined by a limit switch 62 previously described. When the out limit position is reached, the machine will describe a longitudinal traverse motion in the opposite direction, with the tool withdrawin to the out position, back toward the starting point. This reverse longitudinal traverse motion, or reverse of the longitudinal feed is indicated at "e" and will be stopped at a point indicated at "a'" corresponding to that at which the stylus previously left the template upon reaching the first plateau or desired depth of cut in the original longitudinal feed direction. This is accomplished, as will be hereinafter more completely set out in connection with the control circuitry of FIGURES 3 and 4, through operation of an adjustable limit position sensing and control apparatus. This apparatus has for its main memory element a first transducer 60 which continuously records or indicates the position of the carriage along the longitudinal axis in FIGURE 1. This transducer or signaling device is combined in a bridge type circuit, to be later identified, with a second controller which is operative only during the period of time when the tracer is in engagement with the template. By comparing the two transducer signals an indication is obtained of the point where the tracer last left the template so that the carriage may be stopped at this point in its movement "e" to start the next succeeding machining operation.

This apparatus is controlled by a sequencing stepping switch having five positions, the first of which is indicated by the letter "a" or the start position in FIGURE 2. At the second switch position, the cross slide will feed in, the in direction being toward the template and work piece, and will continue such in feed until the template is contacted or a plateau or desired depth of cut level is reached as will be hereinafter set forth. Thus, as is shown in FIGURE 2, the second position of the stepping switch identified by "b, b', b'', b'''," represents the in feed direction for the multiple cut control apparatus. The succeeding higher primes in the diagram indicate the succeeding steps of the stepping switch in a multiple cut operation, each step being started at a new limit position (a, a', a'', a''') and continuing until the template is contacted and the in feed and carriage are adjusted to the new depth of cut level or plateau. When this condition is arrived at, the third position or sequence of the stepping switch is set up in a control circuit to cause longitudinal feed from left to right as shown in FIGURE 2, without further in movement of the cross slide, until the longitudinal limit position 66 or end position is reached indicated by the end of the template. At this point a fixed limit control or switch 65 is contacted which stops carriage feed in the longitudinal direction and sets up a new control condition with operation of the stepping switch to a fourth position in which the cross slide is withdrawn from the template to an out limit position. When this position is reached an additional out limit control 62 is contacted setting forth the return or reverse longitudinal feed movement of the carriage, without further movement of the cross slide, controlled by operation of the fifth position of the stepping switch, causing the machine tool to move in a reverse direction back to the new start position or the adjusted limit position ($a$, $a'$, $a''$, $a'''$) determined by the adjustable limit positioning control apparatus to be hereinafter described.

Figure 3:
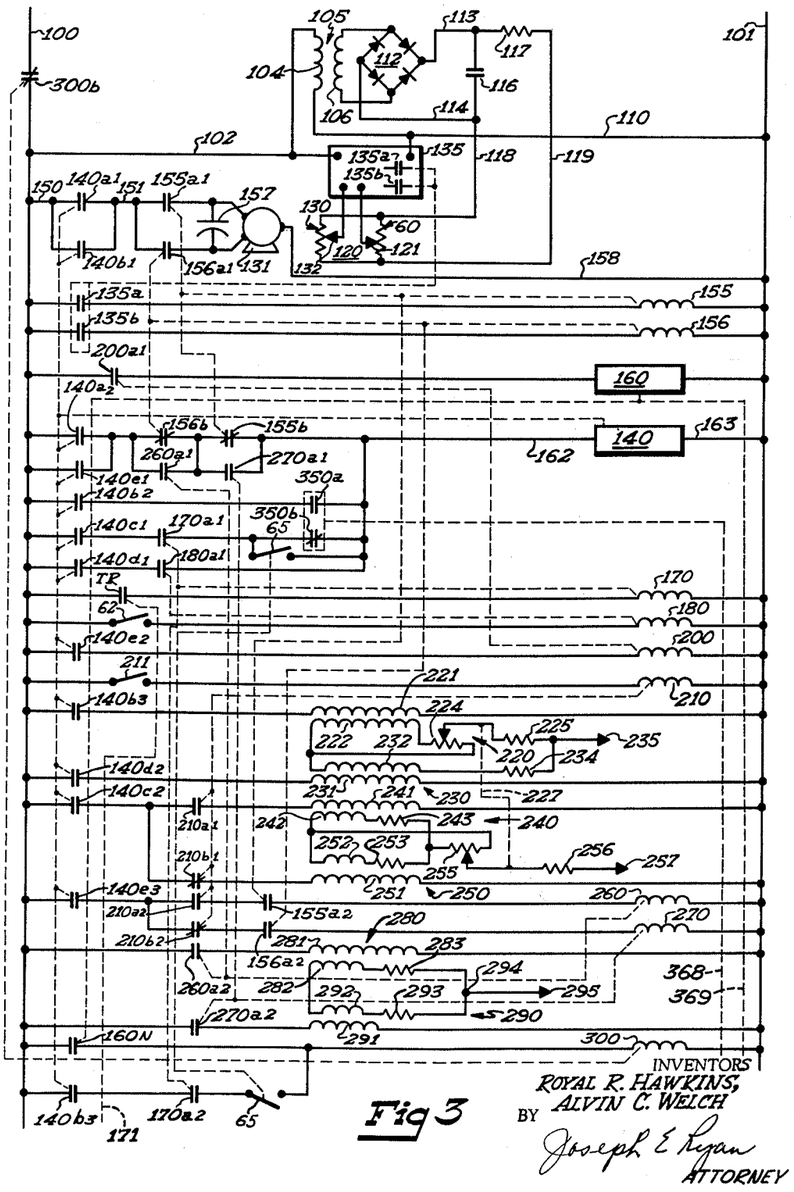
FIGURES 3 and 4 are schematic circuit diagrams of the electrical control apparatus embodying the invention.
Figure 4:
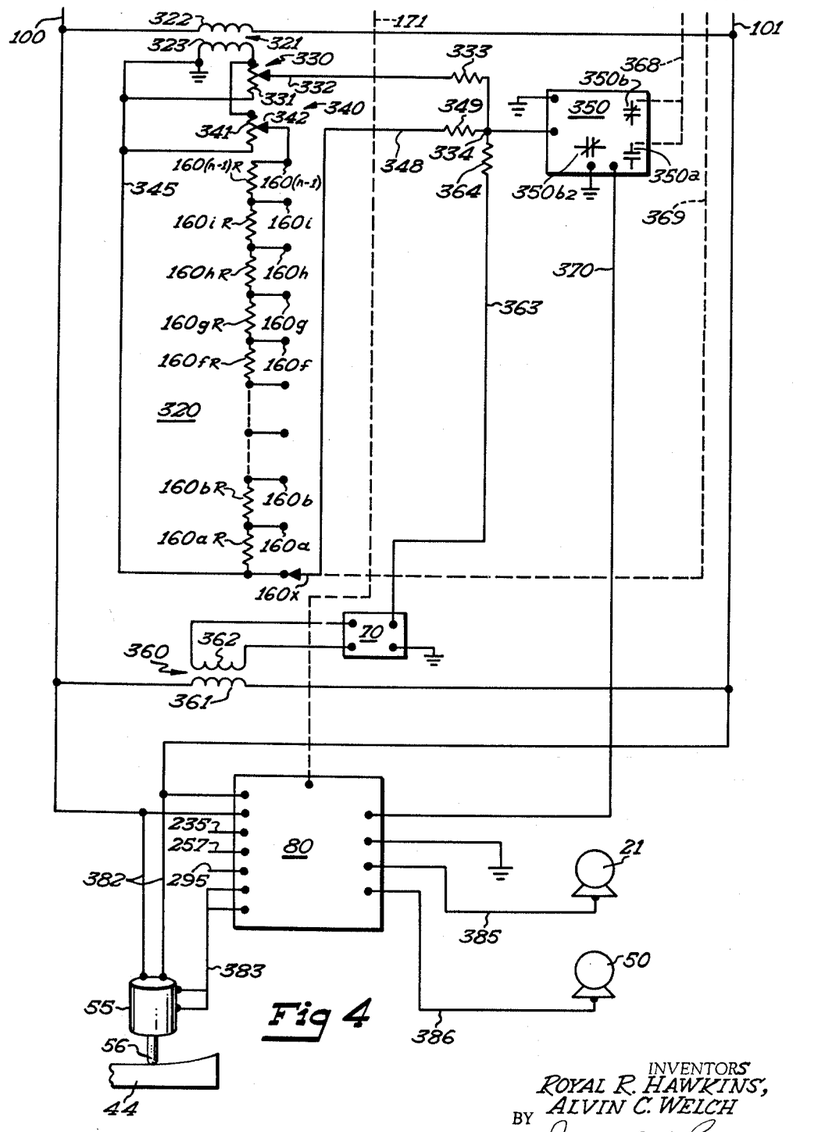

The schematic wiring diagrams of FIGURES 3 and 4 disclose basically the electrical control apparatus and the interconnection therefor going to make up the adjustable limit positioning control together with its association with additional control apparatus forming a multiple pass lathe control. Portions of this circuitry are shown in block since they are conventional, as will be later noted. This improved control circuitry is shown in a straight line type circuit diagram in which a pair of conductors 100, 101 form the supply circuit between which the associated control apparatus is connected for energization purposes. Thus, as is indicated in FIGURE 3, a transformer 105 having a primary 104 and a secondary 106 has its primary winding connected across the line by conductors 102, 110. The secondary winding 106 is connected to a full wave or bridge rectifier 112 whose output circuit 113, 114 includes filtering components comprising condenser 116 and resistor 117 leading to the input diagonals of a control bridge indicated generally at 120 through conductors 118, 119. Bridge 120 includes two potentiometers, one being a helical potentiometer or carriage motion transducer 60 which produces an output or voltage at its wiper 121 proportional to the position of the carriage on the machine tool bed 10 or guides or ways 11 and 12. This wiper will be moved relative to the associated resistance winding with movement of the carriage on the machine tool bed at all times and hence will represent the position of the carriage with respect to the machine tool in the longitudinal axis of movement or feed. The second component in the bridge circuit 120 is a second potentiometer 130 connected to and driven by a control motor 131 whose energization circuit is controlled in a manner to be later described. The movement of wiper 132 of control potentiometer 130 is indicative of the longitudinal movement of the tracer on the template, and wiper 132 moves only during the period of time when motor 131 is energized as a result of an unbalance of bridge 120 to cause one of the switches 135$a$ or $b$ to close, and then only during the "$a$" and "$b$" positions of stepping switch 140. The amplifying switching device 135 includes a pair of relays represented by switch contacts 135$a$ and 135$b$ which are included in the energization circuits of additional control elements to be later defined. With no input signal applied to the amplifying switching device 135, both relays will be de-energized and their output circuits or switches 135$a$ and $b$ will be open. With unbalance of the bridge circuit 120 in one direction or the other, one or the other of the switches 135$a$ and $b$ will be respectively closed to set up switching action to be later defined. The output of this bridge will define the relative longitudinal position of the carriage with respect to the point at which the tracer stylus leaves the template and as such will indicate the point ($a'$, $a''$, $a'''$) at which a new cutting operation is to commence with respect to longitudinal axis carriage movement. Under normal longitudinal feed conditions, whenever the tracer is in contact with the template, the control motor 131 will operate the potentiometer 130 or position the same at the same speed or with the degree of movement as the transverse carriage movement potentiometer or transducer 60 is moved by the carriage so that these elements will be kept in electrical alignment.

Control motor 131 is controlled for directional energization and operation through a plurality of sensing contacts as will be seen in FIGURE 3. For the purpose of identification of the contacts with the relay or switch with which they are associated, the contacts in the various circuits will be identified with a letter symbol following the same number that is used to identify the relay or switch. Where the particular contacts involved are related to a sequentially operated multi-position switch such as a stepping switch, different letters will be used to represent the different positions of the switch. Thus, in the control energization circuit for motor 131 there appears a pair of contacts in parallel which will be identified as 140$a_1$ and 140$b_1$ which contacts represents the first and second positions of a five position stepping switch generally indicated at 140 and in addition the subscript 1 will represent the first of a plurality of similar circuit contacts for each position which are simultaneously operated to the same circuit condition. Thus, the contacts 140$a_1$ and 140$b_1$ are connected in parallel circuit through a conductor 150 to the supply conductor 100 and through a conductor 151 to a second parallel circuit which includes contacts identified as 155$a_1$ and 156$a_1$ leading to the input conductors of motor 131. A phasing condenser 157 is connected across this parallel circuit for phase shifting purposes and directional control. The circuit is completed through a conductor 158 to the supply conductor 101. The contacts 155$a_1$ and 156$a_1$ represent the contacts of two relays 155 and 156 which are connected to the conductors 100, 101 for energization with the contacts 135$a$, 135$b$ respectively included in their energization circuit. The "$a$" designation represents a normally open contact or first circuit condition for these respective relays and the 1 suffix represents the first of the number of normally open contacts which are further identified in the drawing of FIGURE 3 by broken line leading from the respective relay coils to the contacts so identified throughout the circuit. The relays 155, 156 are directional control relays which respond to the output of the bridge circuit 120 or the amplifying switching device 135 associated therewith to be selectively energized whenever the bridge circuit is unbalanced in one direction or the other. These relays will have their respective contacts in the energization circuit for motor 131 and will directionally control the energization of the motor 131 during conditions of the first and second positions of energization of the stepping switch 140 to cause the motor to drive in such a direction to rebalance the bridge 120. The stepping switch 140 which has five positions corresponding to the designations $a$, $b$, $c$, $d$ and $e$ in FIGURE 2 for the paths of movement described by the tracer head relative to the template and the tool relative to the work piece has its contacts identified as 140$a$, $b$, $c$, $d$ and $e$ with the subscripts 1, 2, etc. depending upon the number of similar contacts for each switch position as will be evidenced from the control circuit in FIGURE 3. This stepping switch is the primary controller for the multi-pass or multiple cut lathe operation and sequences the various steps of control movement. Thus, the motor 131 will be energized and the control potentiometer 130 associated therewith will be operative only during the first two positions of operation of this sequencing switch which are basically the start position and the in feed direction of motion of the cross slide toward the template. The control circuitry includes a second multiple position stepping switch, a plateau stepping switch, identified at 160 which switch may have any number of positions desired depending upon the number of desired cuts or plateaus of movement for use in a multiple cut operation. Thus, the switch will be described herein as an "$n$" position switch wherein "$n$" can be any number, and the position shown will be identified $a$, $b$, $c$ and $d$, etc. through "$n$" where "$n$" is the last switch position for an "$n$" numbered switch. The stepping switch 160 is utilized, as will be later noted, for connecting into the tracer control circuit a plurality of incremental resistors which define desired cross slide positions for the various plateaus which are balanced in the circuit with the remaining portion of the tracer control apparatus to be hereinafter identified. In the control circuit of FIGURE 3, the stepping switch 160 is energized through a contact identified as 200$a_1$, this being the first position and first contact of a two position relay generally identified in the circuit at 200.

The five position stepping switch 140 is also connected across the supply conductors 100, 101 through a series of contacts controlling the energization of the same. Thus, it is energized through a first circuit comprising contacts $140a_2$ and $140e_1$ in parallel connected to the supply conductor 100 and through a second and third parallel branch and comprising contacts $156b$ and $260a_1$ in parallel and contacts $155b$ and $270a_1$ in parallel. The contacts $260a_1$ and $270b_1$ represent the first contacts or normally open contacts of a pair of relays identified at 260, 270 respectively. This three sets of paralleled contacts are connected by means of a conductor 162 to the operative mechanism of the stepping switch 140 and from the conductor 163 to the supply conductor 101. Although not shown, it will be understood that the block indicated by the stepping switch 140 will include a normal interrupter for stepping operation. The before-mentioned group of parallel contacts also have in parallel therewith three additional sets of parallel circuits, each of which is controlled primarily by additional contact positions of the stepping switch 140. Thus, the first of this group of parallel circuits includes the contact $140b_2$ and a normally open contact $350a$ of a second differential amplifier relay arrangement 350 (FIGURE 4) which will be more fully identified hereinafter. This differential amplifier relay arrangement basically responds to the difference between the desired depth of cut and actual cross slide position on the carriage and when the desired depth of cut or plateau is reached a normally open contact identified by $350a$ will be closed. Under all other conditions the contact $350b$ will be closed with energization of the differential amplifier 350. Thus, the first parallel circuit to the three sets of the before-mentioned contacts $140a_2$ and $140e_1$, $156b$, $260a_1$ and $155b$, $270a_1$ includes a circuit comprising the contacts $140b_2$ and $350a$ which are connected in series and to the conductor 162 leading through the stepping switch 140 to the supply conductor 101. A second parallel circuit of this group includes the contact $140c_1$ and a relay contact $170a_1$ of a relay 170 which is basically the trace relay for the control apparatus. This circuit also includes the normally closed contact $350b$, having in parallel connection therewith limit switch 65, which connects the conductor 100 through the conductor 162, switch 140, and conductor 163 to the conductor 101. The third parallel circuit in this group includes the contact $140d_1$ or the fourth position of the stepping switch and the contact $180a_1$ of a relay to be hereinafter identified, these contacts being connected in series to the conductor 162, switch 140, and conductor 163 to the supply conductor 101. Thus, for each switch position of the stepping switch 140, one of its contacts is in the energization circuit to permit energization of this device 140 under other conditions of circuit operation.

The relay 170 is controllably energized and connected between the supply conductors 100, 101 through a contact identified as TR, this being the contact of the tracer which is deflected or closed to energize the relay 170 whenever the tracer is in engagement with the template. The dotted line indicated at 171 extending into FIGURE 4 indicates the mechanical connection between the tracer head, to be later identified, and this contact. Similarly, the relay 180 is controllably energized or connected between the supply conductors 100, 101 through a contact 62 identifying the out limit switch or the out position of the cross slide, this unit being located on the cross slide, as indicated in FIGURE 1. The relay 200 is connected between the supply conductors 100, 101 through the fifth position of the stepping switch 140 or the contact $140e_2$. As previously indicated, a switch of relay 200 is included in the energization circuit of the "n" position stepping switch 160 to control the energization of the same upon each "out" sequence of the stepping switch 140.

The next relay unit to be considered is relay 210 connected across the supply conductors 100, 101 through a manually operable switch indicated at 211. Relay 210 has two sets of normally open and normally closed contacts identified as $210a_1, a_2$ and $210b_1, b_2$. This relay unit controls the direction of trace and in the closed position of switch 211 circuitry to be hereinafter described will be energized in such a direction that the control apparatus or amplifier 80 will be energized to provide longitudinal trace in the direction from left to right, while with the switch 211 closed, and relay 210 energized, its normally closed contacts will be open and its normally open contacts will be closed to provide a reverse directional energization of the amplifier 80 to provide for tracing in the opposite direction, that is right to left. This control switch 211 is normally located in proximity to the operator and when once established for a sequencing of machine operation will not be altered.

The actual feed signals supplying or controlling the direction of trace and direction of movement of the cross slide are also controlled by the various positions of the stepping switch 140. Thus, as will be seen in FIGURE 3, a pair of transformers 220, 230 have primary windings respectively 221 and 231 connected across the supply conductors 110, 111 through various switching positions of the switch 140, namely switch contact $140b_3$ and switch contact $140d_2$. The respective secondary windings of the transformers 220, 230, namely windings 222, 232 are connected through trimming and summing resistors to an output terminal 235 leading to the input of the control amplifier 80 (FIGURE 4) as will be later identified. Thus, the secondary winding 222 has connected in series therewith a ratio potentiometer or adjusting potentiometer 224 which in turn is connected to the opposite extremity of the winding 222, with the wiper of the potentiometer 224 leading through a summing resistor 225 to the output terminal 235. The secondary winding 232 is connected through a fixed resistor 234 to the output connection 235 with the opposite extremity of the secondary winding 232 being connected in common with the similar extremity of the secondary winding 222 to complete the control circuit. Thus, the transformer 220 will normally supply the signals for the cross slide in the in feed direction or corresponding to the operation of the machine tool established by the position $b$ of switch 140. The adjustable potentiometer 224 is shown connected by a dotted line indicating a mechanical connection, as at 227, with another potentiometer to be later identified controlling longitudinal feed rate for dual steering purposes. The fixed resistor 234 establishes a fixed level of output speed for the cross slide which signal is effective on the operation of the switch 140 to the "d" position for reverse movement of the cross slide. The longitudinal feed rate is similarly controlled or energized through a pair of transformers 240, 250 which have their respective primary windings 241, 251 connected across the supply conductors 100, 101 through a plurality of contacts. The first of these contacts is the contact $140c_2$ representing the third position of operation of the switch 140 or that for longitudinal feed in the feed direction, that is from left to right in FIGURE 2. This contact is connected in series with parallel circuits including the primary windings 241, 251 and normally open and normally closed contacts $210a_1$ and $210b_1$ of relay 210 controlling directional feed of the carriage in the longitudinal traverse direction. Thus, one or the other of the contacts $210a_1$ or $b_1$ will be closed depending upon whether relay 210 is energized or de-energized and only one or the other of the transformers 240 or 250 will be energized to supply an output signal therefrom with closure of the contact $140c_2$ upon operation of the stepping switch to the third position. The transformers 240, 250 each have secondary windings 242, 252 respectively which have connected in series therewith voltage dropping resistors 243, 253 which resistors are connected in common and to an adjustable potentiometer 255, the wiper of which leads to a summing resistor 256 and the output terminal 257 of the longitudinal axis input signal. The adjustable potentiometer 255 is actually connected in parallel with the parallel connected secondary windings and summing resistors 243, 253 respectively. With this circuit connection, whenever the switch 140 is in its third or transverse position, one or the other of the contacts $210a_1$ or $b_1$ will permit energization of one or the other of the transformer windings 241, 251 to provide an output signal of opposite polarity or phase and variable magnitude depending upon the adjustment of the potentiometer 255 to the tracer amplifier 80 as an input signal in the longitudinal direction for a given trace direction as determined by switch 211. It will be noted that the potentiometers 255 and 224 are ganged together or manually adjustable for simultaneous adjustment of cross slide and traverse speed signals.

In addition to the above, stepping switch 140 also controls the energization of two additional transformers 280 and 290 supplying a fixed speed signal for the reverse longitudinal traverse direction with the cutting tool in the out or retract position. This circuitry is established by means of a pair of relays 260, 270 which are controllably energized from a fifth position contact of stepping switch 140 and identified at $140e_3$, which contact is connected to a parallel circuit including normally open and normally closed contacts $210a_2$ and $210b_2$ of relay 210 and, in addition, contacts $155a_2$ and $156a_2$ respectively of the directional control relays which are controllably energized and operated through operation of the amplifying switching device 135. The transformers 280, 290 include primary windings 281, 291 which are connected across the supply conductors 100, 101 through contacts $260a_2$ and $270a_2$ respectively. Relays 260 and 270 are the trace direction relays which control the respective energization of the transformers 280, 290 selectively to provide a fixed signal to be fed to the control amplifier 80 depending upon trace direction in the longitudinal axis as determined by switch 211. Thus, the transformers 280, 290 include in addition secondary windings 282, 292 which are connected in common at one extremity and through summing resistors 283, 293 respectively to a common point 294 leading to output terminal 295 which, as will be later noted, is connected to the control amplifier 80. Thus, it will be seen that one or the other of the transformers 280, 290 is energized in the fifth position of operation of the stepping switch 140, depending upon whether switch 211 is open or closed.

FIGURE 3 also includes a stop relay 300 which is connected across the supply conductors 100, 101 through a normally open contact $160n$ representing the final position for plateau stepping switch 160. This contact has connected in parallel with it as an additional limiting control or an alternative limiting control a contact $140b_3$ or the second position of stepping switch 140 in series with a contact $172a_2$ from the trace relay 170 and the limit switch 65 on the carriage motion. Thus, end of trace or multipass operation is determined and relay 300 is energized by the operation of stepping switch 160 through the final position which in effect is a stop position for the plateau stepping switch 160 or, as an alternative, upon the end of a trace cycle whenever the trace relay 170 has been energized indicating that no further plateaus are present and the limit switch 65 is engaged. The contact of relay 300 is included in the energization line or supply conductor 100, as evidenced by the normally closed contact $300b$. Under de-energization or normal operation, this contact will not prevent energization of the entire network but upon reaching the final limit position as evidenced by the final position of stepping switch 160, or when the tracing relay has been energized throughout the entire cutting portion of the cycle and the ultimate limit position (65 closed) is reached, the apparatus will be shut down.

The schematic diagram of FIGURE 4 is actually a continuation of the diagram of FIGURE 3 and includes in addition a schematic disclosure of the tracer head 55, template 44, control amplifier 80 and cross slide and carriage drive motors 50 and 21 respectively. This portion of the wiring diagram deals primarily with the plateau adjusting resistance stepping switch 160 or circuitry indicated generally at 320 which is controllably energized by transformer 321 having a primary winding 322 connected directly across the supply conductors 100, 101. The secondary winding 323 has connected in parallel therewith an adjustable potentiometer 330 whose winding 331 is connected directly across the secondary winding 323. The wiper of the potentiometer 330 indicated at 332 is connected through a summing resistor 333 to a common summing point 334 leading to the input of the differential amplifier indicated generally at 350. The potentiometer 330 is adjusted to provide a signal in terms of the plateau start position and is always connected in the circuit. A second potentiometer indicated at 340 includes a winding 341 also connected across the secondary winding 323 of the energizing transformer and with a wiper 342 leading to the next to the last position of the plurality of switches controlled by or included in the stepping switch 160 previously described. Each of these switches has connected across the same a resistance component identified by an "R" subscript after the switch designation such that by closure of the switch, the particular resistance component may be shorted out of the circuit. The first switch position is connected by means of a conductor 345 to the opposite side of the transformer or common side of the transformer or secondary winding 323 to complete the energization circuit. The common connection on the stepping switch represented by the wiper $160x$ is connected through a conductor 348 to a summing resistor 349 leading to the common point 334 and the input of the differential amplifier 350. Thus, movement of the switch 160 with each step of operation and adjusting a new plateau will move the wiper $160x$ in the schematic disclosure between the respective contacts effectively shorting out the succeeding switch segments and hence the respective resistors associated therewith to vary the voltage output from the plateau adjusting resistance switching unit 320. Potentiometer 340 adjusts the ratio of the respective steps by varying the energization of the entire resistance bank. The output signal is summed through the summing resistor along with the start position signal (potentiometer 330) to the input of the differential amplifier 350. In addition thereto, amplifier 350 receives an additional signal in terms of a position feedback signal from the cross slide transducer 70 which is energized by a transformer 360 having a primary winding 361 connected across the supply conductors 100, 101 and the secondary winding 362 leading to the energization circuit of the transducer 70. Its output is also connected through a conductor 363 and summing resistor 364 to the common point 334 leading to the input of the amplifier 350. This is a feedback signal which balances out against the desired depth or plateau signal to control the energization of the amplifier 350 in such a manner as to in turn control the operation of amplifier 80 to prevent further cross slide movement toward the work piece when a desired depth of cut of plateau has been reached. The amplifier 350 is shown as including normally open and normally closed contacts $350a$ and $350b$ located in the schematic diagram of FIGURE 3. The dashed line indicated at 368 leading to the contacts in the FIGURE 3 disclose this relative positioning or relationship of parts, the contacts being actually included in the amplifier 350. Similarly, the dotted line 369 leading from FIGURE 3 and the switching device indicated in block at 160 in FIGURE 3 actually represents the contacts 160, $a$ through $n-1$, included in FIGURE 4. In addition, the normally closed contact $350b_2$ is shown connected by means of a circuit conductor 370 to the input of the control amplifier 80 indicated in block at FIGURE 4. As previously indicated amplifier 80 is conventional and the plateau adjusting resistance switching unit 320 is utilized for controlling the input signals to the control amplifier 80 for controlling the cross slide motor 50 in the cross feed directions of motion. The diagram of FIGURE 4 also includes an energization circuit of the control amplifier 20 indicated by the extension of supply conductors 100, 101 to the control amplifier 80 as well as to the tracer head 55 as indicated by the supply conductors 382. The output of the tracer head as indicated by conductor 383 is connected to the input of control amplifier 80. The control amplifier is shown schematically only as controlling, by the conductors 385, 386, the cross slide and longitudinal traverse or carriage motors 50 and 21 respectively. In addition to the above, the broken line 171 extending from FIGURE 3 discloses that the contact TR is included in the control amplifier 80 and is effective in controlling the trace relay 170 in FIGURE 3 as previously described. The control amplifier 80 also receives signals from supply conductors 235, 257 and 295, from FIGURE 3 representing the feed in and feed out feed input signals as controlled by the relay circuitry previously described (conductor 235), and the longitudinal traverse feed signals in the forward or trace and the reverse directions as indicated by the conductors 257, 295.

In operation, the tracer portion of the control apparatus for operating the lathe is conventional and is shown herein in block form for purposes of simplicity. Input signals from the tracer, balanced by movement of the cross slide, will determine the relative position of the tool to the work piece and the stylus to the template, to control the energization of a pair of motors which position the elements of machine tool relative to the work piece to define or trace the pattern associated with the tracer head. Similarly, the concept of multiple pass control through the use of adjustable steps sequentially connected into a tracer control system is recognized. The present disclosure of the multi-pass, with plateau adjusting circuitry, is shown in simplified form and with the associated amplifying equipment in block since it will be recognized that other modes of control may be utilized for this purpose. The adjustable limit positioning control apparatus utilizes a comparison of the actual carriage position along the longitudinal axis with a motor driven potentiometer which is operative only during the period of time when trace operation takes place, to define new starting positions in a multiple cut machining operation. Thus, as was seen in connection with FIGURE 3, the carriage position transducer or potentiometer 60 is compared with the motor driven potentiometer 131 in a bridge circuit, with the output of the same controlling an amplifying switching device 135 which in turn controls the energization of a pair of relays, the output of which is utilized to control the direction of rotation of the drive motor 131 of the potentiometer 130. This motor driven potentiometer is driven at a rate compatible with or similar to the drive speed on the longitudinal carriage so that the potentiometer 130 will follow the carriage potentiometer 60 and represent a particular position of the carriage during the period of time of a tracing operation. The multi-pass control apparatus is controlled by a five position stepping switch 140 which sets up a plurality of relay circuits for the purpose of energizing the control amplifier 80 and operating the associated carriage and cross slide motors 21 and 50 for given sequences of operation. This five position switching unit indicated at 140 will allow energization of the motor 131 during its first two phases of operation during which tracing can take place in the feed direction. Motor 131 is operated also only during the period of tracing operation until a particular plateau level is reached during the multi-pass operation at which time further cross slide movement will be prohibited and longitudinal carriage movement only will be provided for machining. A second plural stepping switch 160 adjusts the various desired levels cut or plateaus feeding a signal into an associated differential amplifier 350 to control the operation of the control amplifier 80 to control the drive motors for cross slide and longitudinal drive. Associated apparatus includes interlocking circuits for stepping the stepping switch 140 so that each new sequence of operation will be provided after a particular condition of the preceding cycle or step has taken place. In considering the operation of the apparatus during multiple cut operation, the stepping switches 140, 160 will be considered as in their homing position. The motor 131, if an unbalance appears in the amplifier 135, will be energized through the first position contact or start position contact of stepping switch 140 to cause alignment of potentiometer 130 with the carriage potentiometer or transducer 60. Under these conditions a start switch (not shown) is permitted to operate, energizing the entire circuitry through the normally closed contacts of the stop switch 300. Stepping relay 140 will move from its number $a$ position to its number $b$ position through contacts $155b$, $156b$, or on subsequent steps through circuitry made through the contacts of trace direction relays 260 or 270. With the stepping of switch 140 to position $b$, the cross slide motor 50 will be energized in the "in" direction through the contact $140b_3$ supplying a signal to the control amplifier 80 through the cross slide signal conductor 235. This introduces a feed in signal to the cross slide motor 50, the rate of which is set by the potentiometer 224. During this period of time, the plateau stepping switch 160 is in its first or $a$ position set for the first plateau adjustment or depth of cut. The motor 131 can be energized during this period of time if the potentiometers 160 and 130 are out of alignment, which will cause the motor 131 to drive back into the condition of alignment. During this period of time the differential amplifier 350 for the multi-pass will have been deenergized by an unbalance between the signal of the selected depth of cut and the signal indicative of the actual cross slide position. Its operation controls the energization of the control amplifier 80 to energize the cross slide motor 50. As the cross slide drives toward the work piece, the tracer TR contact will be closed with engagement of the tracer stylus and template, energizing the trace relay 170 and providing an additional circuit within the control amplifier 80 causing carriage motion to commence through energization of the motor 21. As the tracer follows the template and the cross slide moves in to reach the first plateau level, the differential amplifier 350 will have operated its contacts. With engagement of the tracer and movement of the carriage, the amplifying switching device 135 will be unbalanced by movement of the carriage transducer 60 relative to the potentiometer 130 and hence one or the other of the relays 155, 156 will be energized to set up an energization circuit for motor 131 to drive the potentiometer 130 in a direction to remove the unbalance in the bridge 120. The tracing of the template is set at a rate determined by a signal impressed on the carriage drive motor 21 and by conductor 257 feeding the control amplifier 80. When the first plateau is contacted, the differential amplifier 350 will energize its relay contacts closing contact $350a$ and setting up the circuit for the stepping switch 140 through the contact $140b_2$. At the same time, the tracing signal from the tracing head 55 no longer causes further cross slide motion toward the work piece. Operation of the stepping switch 140 to position $c$ and opening of the trace relay 170 will cause de-energization of motor 131, marking the position at which the tracer has left the template. The energization of stepping switch 140 to position $c$ also sets up the longitudinal drive signal from the contact $140c_2$ and transformer 240 to apply an input to the control amplifier 80 through the conductor 257. The longitudinal motion of the carriage will then commence from the feed signal rather than the tracer signal at a rate determined by this transformer 240 and potentiometer 255, and the signals from the transducer 70 and plateau adjusting resistance switching unit 320 will become a command for the differential amplifier 350. This will insure that the apparatus will control to this particular depth of cut throughout the entire $c$ phase of the operation of stepping switch 140.

Movement of the carriage 15 in the longitudinal feed direction will continue until the tracer again contacts the template or until the out limit switch 65 is contacted. When switch 65 is contacted, the cross slide will retract in the out feed direction through energization of the contact $140c_1$ and the energization of relay 120 as the tracer engages the raised end of the template, to step the stepping switch 140 to position $d$. The energization of stepping switch 140 to this position will close the contact $140d_2$ and set up the retract speed signal for the cross slide motor 50 through the transformer 230 and fixed summing resistor 234 to energize the control amplifier 80 through the conductor 235 for cross slide motion at a fixed retract rate. The opening of the contact $140c_2$ de-energizes the transformers 250, 240 and cuts off the longitudinal feed command to the control amplifier 80. Thus, the longitudinal axis will receive a zero input and remain stationary and the cross slide will move until the out limit switch 62 on the carriage is contacted, closing the same and energizing the relay 180. This will set up an additional circuit for the stepping switch 140 through the contact $140d_1$ and contact $180a_1$ to step the stepping switch 140 to the $e$ position or reverse direction of longitudinal feed. As stepping switch 140 is operated to position $e$, the relay 200 is energized, setting up the circuit for energization of the plateau stepping switch 160 through contact $200a_1$ stepping in the next plateau level for the cross slide or multi-pass control apparatus. At the same time, the contact $140e_3$ is closed, setting up a circuit through one or the other of the contacts $210a_2$ or $b_2$ and one or the other of the contacts $155a_2$ or $156a_2$ to energize one or the other of the relays 260, 270 and cause directional energization of the reverse longitudinal feed through the transformers 280, 290 through the input conductor 295 for control amplifier 80. The contacts $155a_2$ or $156a_2$ will be closed, depending upon the direction of feed, because of unbalance of the bridge circuit 120 during the period of longitudinal trace and reverse movement with movement of the carriage transducer 60. It will be remembered that the motor 131 will have stopped at the point where the tracer last left the template while the carriage transducer has continued movement with the carriage so that the bridge 120 will be unbalanced and the amplifying switching device 135 will close one or the other of the contacts $145a$ or $b$. Since the stepping switch 140 is not in positions $a$ or $b$, at this time, the energizing circuit from the motor 131 will not have been made active so that the bridge will remain unbalanced. As the cross slide then traverses back toward its starting position at full longitudinal motor speed of motor 21 set by the reverse longitudinal movement transformers 280 or 290, the bridge circuit 120 again approaches balance condition with movement of the carriage transducer 60 back toward the starting point. The plateau stepping switch 160 which was energized by the contact $200a_1$ will not step until the energizing signal is removed therefrom so that the new plateau level for the multi-pass control apparatus will not as yet have been inserted into the control of the control amplifier 80. When the cross slide is traversed enough so that the two potentiometers 130 and 60 are aligned, the amplifying switching device 135 will cause both of its switches $135a$ and $135b$ to open, and as a result relays 155 and 156 are deenergized. This will complete the energization circuit for the stepping switch 140 through the contacts $140e_1$, $156b$ and $155b$ to cause the stepping switch 140 to move to the start or $a$ position where the entire sequence starts again. Movement of the stepping switch 140 off of the $e$ position to the $a$ position will de-energize the relays 260, 270 and hence the input command in the longitudinal axis through the conductor 295 to the control amplifier 80. The movement of the carriage thus in the longitudinal reverse direction will be stopped at a point corresponding to the new limit position wherein potentiometers 60 and 130 are balanced so that the entire sequence may begin again without having to traverse the portion of the work previously cut in accordance with the template. Thus, the limit position becomes adjustable with each succeeding step, and the new limit position for each succeeding pass is defined by the points at which the tracer leaves the template.

The circuit setting up the stepping of the stepping switch 140 to the start position will be made through the contacts $140e_1$ and normally closed contacts $156b$ and $155b$. In stepping the stepping switch 140 to the $a$ position, and additional circuit will step the stepping switch 140 from the $a$ to the $b$ or second position through the contact $140a_2$ and the normally closed contacts $156b$ and $155b$. Thus, the entire sequence of operation will again be repeated, this time for the new depth of cut setting caused by the dropout of the contact $200a_1$ and energization of the plateau stepping switch 160 with completion of the $e$ step of the stepping switch 140. The new plateau signal will cause cross slide movement, as previously set forth, through the plateau adjusting resistance switching unit 320 and the differential amplifier 350. On the final step when the contact 160N is closed, or whenever the tracer has traced the template during the entire $b$ position of stepping switch 140, that is contact $170a_2$ is closed, and the out limit switch 65 is closed, a circuit is set up for the step relay 300 which opens its contact in the supply conductor 100 to shut down the apparatus. Thus, it will be seen that the apparatus will set an adjustable limit position $a'$, $a''$, or $a'''$, as determined by potentiometers 130 and 60, at the start of the longitudinal feed motion for cutting of the work piece.

While we have not shown the same, it is possible that the adjustable limit position control may be applied to other apparatus than a lathe and multiple pass control apparatus. It is particularly applicable to any machining operation wherein a sequence of machine functions are performed and it is desired to start at a different point in accordance with some phase of the machine function.

Therefore, in considering this invention it is intended that the present disclosure be considered as illustrative only and the scope of the invention should be determined only by the appended claims.

We claim:

1. A machine tool control apparatus for use with a multipass machine tool whose mode of operation involves successive cycles of movement including in each cycle, a motion in a first direction as a working tool engages and works a workpiece, a withdrawal transverse motion as the working tool is withdrawn from the workpiece at the end of a required motion in the first direction, a motion opposite to the first direction to return the working tool for another working operation, and a transverse motion as the working tool is moved into the workpiece, the apparatus comprising;

a template adapted to be mounted in relation to the workpiece, the contour of said template determining the final contour of the workpiece as produced by the working tool,     a signal producing stylus adapted to be mounted for movement with the working tool and adapted to produce control signal means when in engagement with said template,     plural step signal producing means to control the maximum work to be performed by working the tool for succeeding movements of the working tool in the first direction,     first signal producing means indicative of the position of the working tool as it moves in transverse motion into the workpiece,     second signal producing means indicative of the position of the working tool as it moves in the direction opposite to the first direction,     third signal producing means including a control motor,     first means controlled by said signal producing stylus and by said plural step signal producing means and connected to control the transverse motion of the working tool into the workpiece and the working tool motion in the first direction to cause the working tool to follow the template contour until the maximum work is performed as controlled by said plural step signal producing means, second means including means controlled by said plural step signal producing means and by said first signal producing means to control said control motor to energize the same until such time as the maximum work is performed by the working tool and to then interrupt the control thereof, whereupon said third signal producing means produces a memory signal which is a memory of the position of the working tool in the first direction of motion where the working tool no longer followed the template, third means effective at the end of the required movement in the first direction to institute the withdrawal transverse motion of the working tool and thereafter to institute the motion opposite to the first direction, and fourth means controlled by said second signal producing means and by said third signal producing means to compare the signal of said second signal producing means to said memory signal and to interrupt the motion opposite to the first direction upon the working tool reaching the position where the working tool no longer followed the template.

2. A machine tool control apparatus for use with a multipass machine tool whose mode of operation involves successive cycles of movement including in each cycle, a motion in a first direction as a working tool engages and works a workpiece, a withdrawal transverse motion as the working tool is withdrawn from the workpiece at the end of a required motion in the first direction, a motion opposite to the first direction to return the working tool for another working operation, and a transverse motion as the working tool is moved into the workpiece, the apparatus comprising;

a template adapted to be mounted in relation to the workpiece, the contour of said template determining the final contour of the workpiece as produced by the working tool, an electrical signal producing stylus adapted to be mounted for movement with the working tool and adapted to produce electrical control signal means when in engagement with said template, plural step electrical signal producing means including a plurality of resistors to control the maximum work to be performed by the working tool for succeeding movements of the working tool in the first direction, first electrical signal producing means indicative of the position of the working tool as it moves in transverse motion into the workpiece, second electrical signal producing means indicative of the position of the working tool as it moves in the direction opposite to the first direction, third electrical signal producing means including a control motor, first electrically controllable means controlled by said signal producing stylus and by said plural step signal producing means and connected to control the transverse motion of the working tool into the workpiece and the working tool motion in the first direction to cause the working tool to follow the template contour until the maximum work is performed as controlled by said plural step signal producing means, second electrically controllable means including means controlled by said plural step signal producing means and by said first signal producing means to control said control motor to energize the same until such time as the maximum work is performed by the working tool and to then interrupt the control thereof, whereupon said third signal producing means produces a memory signal which is a memory of the position of the working tool in the first direction of motion where the working tool no longer followed the template, third electrically controllable means effective at the end of the required movement in the first direction to institute the withdrawal transverse motion of the working tool and thereafter the motion opposite to the first direction, and fourth electrically controllable means controlled by said second signal producing means and by said third signal producing means to compare the signal of said second signal producing means to said memory signal and to interrupt the motion opposite to the first direction upon the working tool reaching the position where the working tool no longer followed the template.

3. A machine tool control apparatus for use with a multipass machine tool whose mode of operation involves successive cycles of movement including in each cycle, a motion in a first direction as a working tool engages and works a workpiece, a withdrawal transverse motion as the working tool is withdrawn from the workpiece at the end of a required motion in the first direction, a motion opposite to the first direction to return the working tool for another working operation, and a transverse motion as the working tool is moved into the workpiece, the apparatus comprising;

a template adapted to be mounted in relation to the workpiece, the contour of said template determining the final contour of the workpiece as produced by the working tool, an electrical signal producing tracer head adapted to be mounted for movement with the working tool and adapted to produce electrical control signal means when in engagement with said template, plural step electrical signal producing means including a plurality of fixed value resistors connected to a source of voltage, each succeeding resistor providing an electrical signal to control the maximum work to be performed by the working tool for succeeding movements of the working tool in the first direction, first electrical signal transducer means driven by the machine tool to provide an electrical signal indicative of the position of the working tool as it moves in transverse motion into the workpiece, second electrical signal producing means including a first adjustable potentiometer whose wiper position is indicative of the position of the working tool as it moves in the opposite direction opposite to the first direction, third electrical signal producing means including a second adjustable potentiometer whose wiper position is controlled by a control motor, first electrically controllable means controlled by said signal producing stylus and by said plural step signal producing means and connected to control the transverse motion of the working tool into the workpiece and the working tool motion in the first direction to cause the working tool to follow the template contour until the maximum work is performed as controlled by said plural step signal producing means, whereupon continued working tool motion in the first direction produces the maximum work, second electrically controllable means including means controlled by said plural step signal producing means and by said first signal producing means to control said control motor to energize the same until such time as the maximum work is performed by the working tool and to then interrupt the control thereof, whereupon the wiper position of said second potentiometer constitutes a memory signal which is a memory of the position of the working tool where it no longer followed the template while in the first direction of movement, third electrically controllable means effective at the end of the required movement in the first direction to institute the withdrawal transverse motion of the working tool and thereafter to institute the motion opposite to the first direction, and fourth electrically controllable means including a bridge circuit including said first and second potentiometers and means to compare the signal on said first potentiometer wiper to said memory signal and to interrupt the motion opposite to the first direction upon the working tool reaching the position where the working tool no longer followed the template.

4. A machine tool control apparatus for use with a machine tool capable of moving a working tool transversely into a workpiece to perform work thereon and to, at the same time, move the working tool longitudinally of the workpiece, the apparatus comprising;

a template adapted to be mounted adjacent the workpiece, the template having a contour to be worked into the workpiece, a tracer head adapted to be mounted for movement with the working tool and to engage said template to trace the contour of the same, first control means controlled by said tracer head and adapted to produce the transverse and longitudinal movement of the working tool, a first signal generator adapted to be bi-directionally controlled by longitudinal movement and reverse longitudinal movement of the working tool, said first signal generator providing an output signal indicative of the longitudinal position of the working tool along the workpiece, a second signal generator having bi-directional control means connected to drive said second signal generator, first means connected to be controlled by said first and second signal generators and to provide an output indicative of a differential in the outputs of said first and second signal generators, second control means effective to establish a maximum work to be performed by the working tool for a single longitudinal movement of the working tool, means controlled by said second control means connecting said first means in controlling relation to said bi-directional control means to maintain a balance condition between the outputs of said first and second signal generators only so long as said tracer head engages said template and the working tool moves longitudinally to work the workpiece to an amount less than the maximum work established by said first control means.

and means controlled by said first means to limit reverse longitudinal movement of the working tool and operative upon a reverse longitudinal movement of the working tool to compare the output of said first signal generator to that of said second signal generator and to interrupt the reverse longitudinal movement upon a balance being reached between the two outputs.

5. A machine tool control apparatus for use with a machine tool capable of moving a working tool transversely into a workpiece to perform work thereon and to, at the same time, move the working tool longitudinally of the workpiece, the apparatus comprising;

a template adapted to be mounted adjacent the workpiece, the template having a contour to be worked into the workpiece, a tracer head adapted to be mounted for movement with the working tool and to engage said template to trace the contour of the same, first control means controlled by said tracer head and adapted to produce the transverse and longitudinal movement of the working tool, a first signal potentiometer whose wiper is adapted to be bi-directionally controlled by longitudinal movement and reverse longitudinal movement of the working tool, said first signal potentiometer providing an output signal indicative of the longitudinal position of the working tool along the workpiece, a second signal potentiometer having bi-directional motor means connected to drive the wiper of said second signal potentiometer, first means connected to be controlled by a bridge circuit including said first and second signal potentiometers and to provide an output indicative of a differential in the outputs at said first and second signal potentiometer wipers, second control means effective to establish a maximum work to be performed by the working tool for a single longitudinal movement of the working tool, means controlled by said second control means connecting said first means in controlling relation to said motor means to maintain a balance condition between the outputs of said first and second signal potentiometer wipers only so long as said tracer head engages said template and the working tool moves longitudinally to work the workpiece to an amount less than the maximum work established by said first control means, and means controlled by said first means to limit reverse longitudinal movement of the working tool and operative upon a reverse longitudinal movement of the working tool to compare the output at the wiper of said first signal potentiometer to that of the wiper of said second signal potentiometer and to interrupt the reverse longitudinal movement upon a balance being reached between the two outputs.

No references cited.

JOHN F. COUCH, *Primary Examiner.*